July 2, 1957  H. E. BEST  2,797,962
ANIMATED DRINKING TUBES
Filed Jan. 27, 1956

INVENTOR.
HAROLD E. BEST
BY
ATTORNEYS

United States Patent Office 2,797,962
Patented July 2, 1957

2,797,962

ANIMATED DRINKING TUBES

Harold E. Best, Grand Junction, Colo.

Application January 27, 1956, Serial No. 561,744

4 Claims. (Cl. 299—17)

This invention relates to a child's animated drinking tube, and more particularly, to improvements in drinking tubes of the type designed to attract the child's attention and to induce it to continue its drinking.

The usual drinking tubes for this purpose consist of a transparent tube bent into some interesting design and so constructed that the child can watch the milk or other drink flowing. After such a tube becomes filled with fluid it makes very little difference in its appearance whether the fluid flows or not.

It is the principal object of this invention to produce an animated device that will move and which may resemble a fowl or bird in its movements and which is actuated only when the child is actively engaged in imbibing milk or other liquid such as fruit juices or the like.

Having thus set out the principal object of the invention and briefly indicated some of its characteristics the invention will be described in detail, for which purpose reference will now be had to the accompanying drawing in which one embodiment of the invention has been illustrated, and in which.

Figure 1:
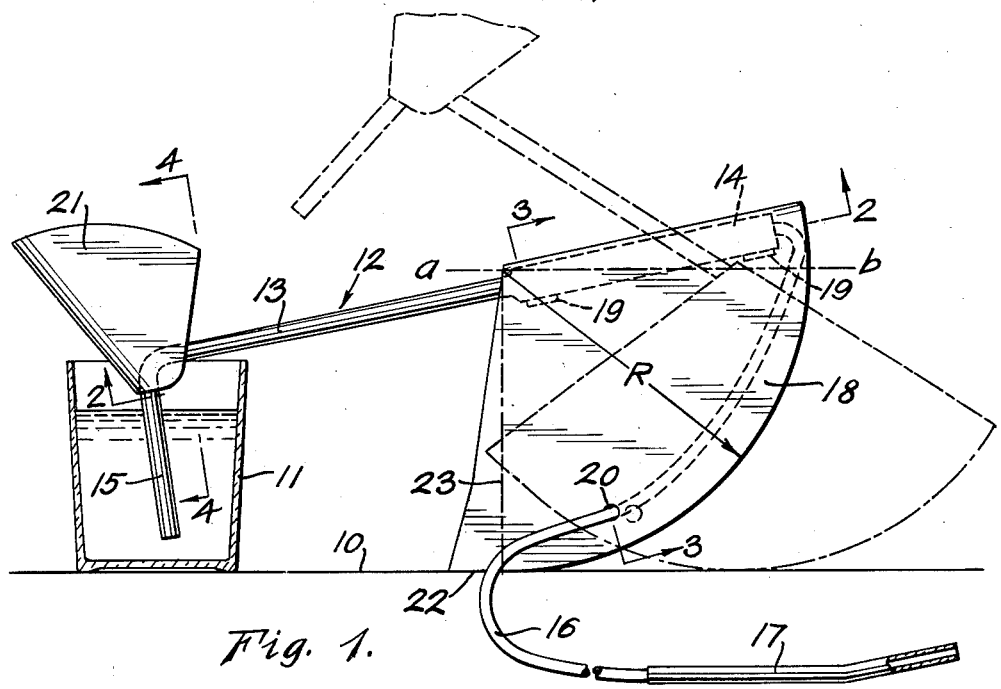
Figure 1 is a side elevational view showing the parts in inoperative position by full lines and in operative or discharging position by broken lines.
Figure 2:
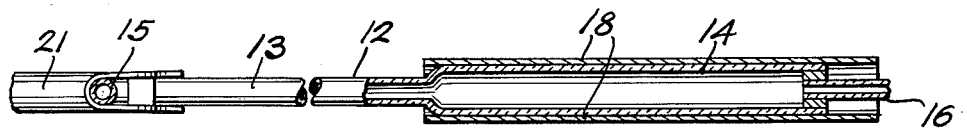
Figure 2 is a section taken on line 2—2 Figure 1.

Referring now to the drawing, reference numeral 10 designates a flat supporting surface and 11 designates a glass partly filled with liquid, such as milk. Parts 10 and 11 form no part of the invention but have been shown to facilitate the description of the invention and to show its operation.

The device which forms the subject of this invention consists of a tube 12 preferably of transparent or translucent plastic, which has two sections of different internal diameter, the smaller section has been designated by numeral 13 and the larger by numeral 14; section 13 terminates in a downwardly projecting portion 15. The outer end of section 14 has operatively connected therewith a flexible tube 16 that terminates in a glass tube 17, which serves as a nipple.

Figure 3:
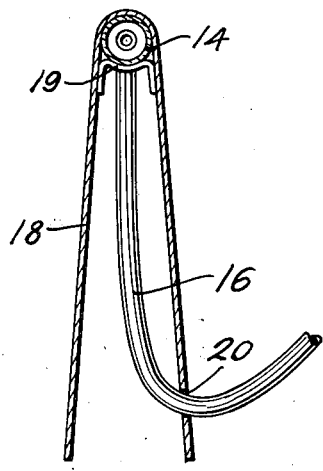
Figure 3 is a section taken on line 2—2 Figure 1.
Figure 4:
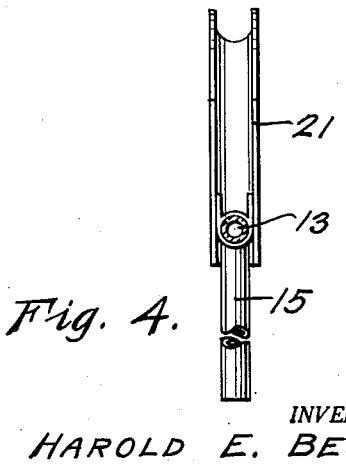
Figure 4 is a section taken on line 4—4 Figure 1.

The tube is supported by a sector shaped base 18, which, in the embodiment illustrated, is formed from sheet plastic that has been cut to the shape of a circular sector of more than 180 degrees in angular extent whose radius has been designated by R. The sector is then folded about the radius bisector of the angle acquiring thus the shape shown in Figure 1. The identical sides of the base have been designated by reference numeral 18. Section 14 of the pipe is positioned in the bight portion of the base as shown most clearly in Figure 3, and is secured in place by a suitable adhesive and by metal members like that shown in Figure 3, and designated by numeral 19. Tube 16 passes from the space between sides 18 to the outside through a hole 20 as shown in Figures 1 and 3. Attached to the outer end of section 13 is a paper or plastic ornament 21 whose outer surface may be painted to represent the head of a fowl or other bird. The outer surfaces of sides 18 may also be painted or ornamented in any desired manner. The tube is so proportioned and so positioned relative to the base that it assumes a downwardly ranging position, like that shown in Figure 1, when it is empty. The peripheral surface 22 from the vertical radius 23 is preferably tangential at the foot of the vertical radius and this serves to prevent rocking and excessive downward tilting.

Operation

Let us now assume that the parts are in the position shown in Figure 1 and that suction is applied to nipple 17. Liquid from glass 11 rises in tube section 13 and this adds to its weight; when the liquid enters section 14 its weight tends to turn the tube clockwise. Since section 14 has a greater volume per unit length the weight of liquid will become great enough to overbalance section 13 with its liquid content and the tube and base then tilts clockwise to the broken line position in Figure 1. The entire liquid contents of the tube can then be withdrawn through tube 16 after which section 13 will overcome the moment of section 14 and return the parts to the full line position in readiness to begin another cycle.

Attention is now called to the rocking movement of the base and to the fact that the axis of tube pivotation travels along straight line $a$—$b$. This movement of the pivot gives to the parts the appearance of a rooster in one of its fighting positions and if the sides 18 are properly ornamented, produces a realistic simulation of a fowl drinking or a cock fighting. The device would function in the manner described if the pivot remained at the full line position and the tube were free to rock about that pivot. The arrangement shown is very effective in attracting a child's attention and the arrangement illustrated is, therefore, desirable.

What is claimed as new is:

1. A child's animated drinking tube comprising in combination: a tube having a first section of selected volume per unit length and a second section having a greater volume per unit length; means comprising a base supporting the tube for tilting movement relative to a horizontal plane, the base being so related to the tube that when the latter is empty the first section will incline downwardly from the second section into a position in which its end can enter a body of liquid positioned in its path and, a suction tube attached to the second section for drawing liquid through the first section into the second section until the weight of liquid in said second section causes it to tilt downwardly thus raising the first section from the liquid and enabling the contents of both sections to be withdrawn through the suction tube whereupon said sections will return to their original positions in readiness for another cycle.

2. A device in accordance with claim 1 in which the base is substantially sector-shaped with the arcuate edge thereof forming the rockable contact with the supporting surface and the apex thereof being attached to the tube at approximately the juncture between the first and second sections.

3. A device in accordance with claim 2 in which the base comprises two substantially identical sector shaped members spaced to embrace the tube which is positioned on a radius, the suction tube extending from the outer end of the second section in the space between the sides of the base thence out through a hole in one of said sides.

4. An animated device comprising: a base; a liquid reservoir open at both ends mounted on the base for tiltable movement about a point between said open ends, the reservoir including a first section of a selected volume per unit length and a second section communicating with said first section having a greater volume per unit length, the weight distribution of the reservoir in relation to the point of tiltable movement being such that when said reservoir is empty, the first section will be lower than the second section but when full the second section will lie lower than the first, the open end of the first section being positoned to enter a body of liquid when the reservoir is empty and raised therefrom when said reservoir is full, and the open end of the second section being positioned to deliver fluid from the reservoir when said reservoir is full; and, means connected to the open end of the second section for drawing liquid from the body into the reservoir when empty.

References Cited in the file of this patent
UNITED STATES PATENTS 2,674,979 Merritt Apr. 13, 1954